May 25, 1926.
J. J. THACHER
1,586,227
LATHE CHUCK
Filed Nov. 20, 1922
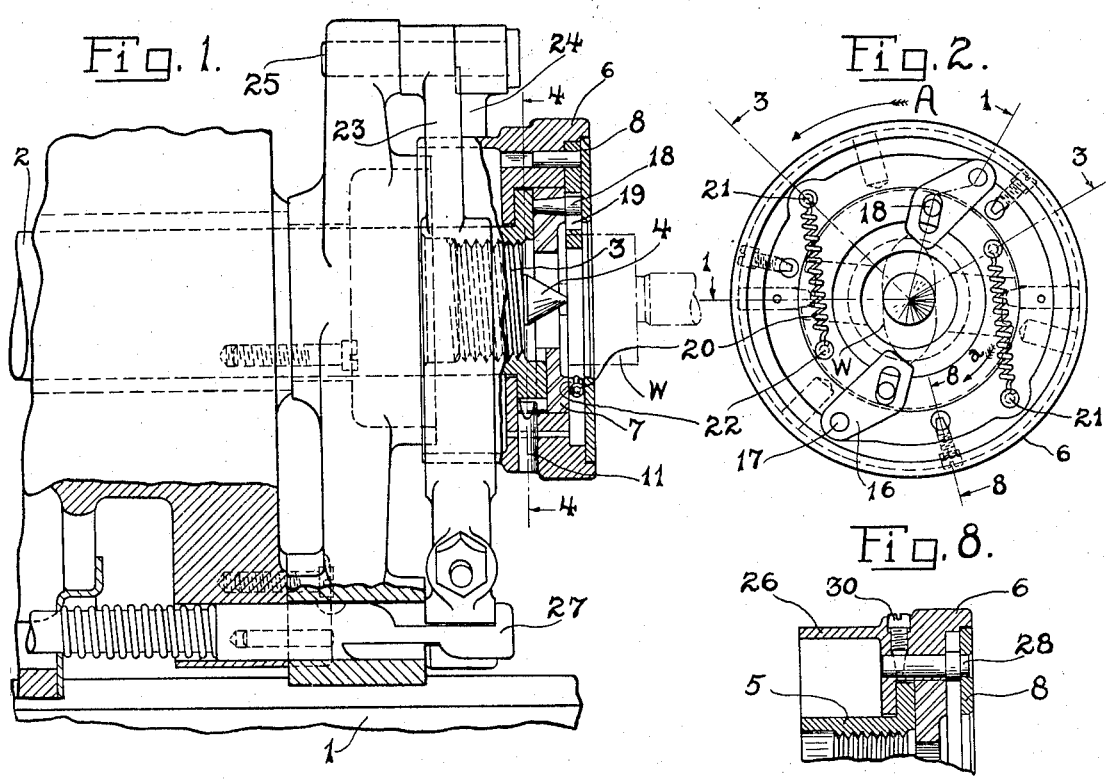
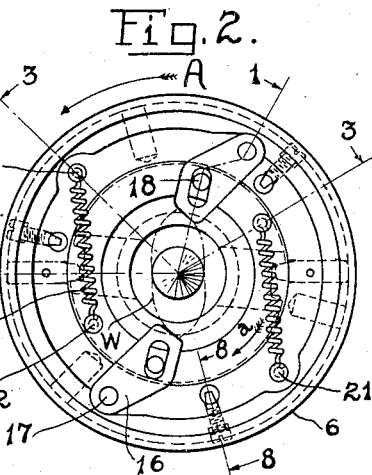
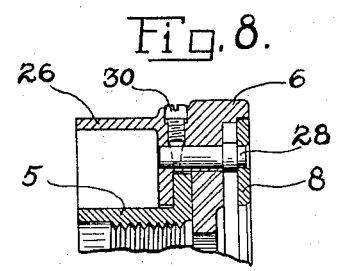
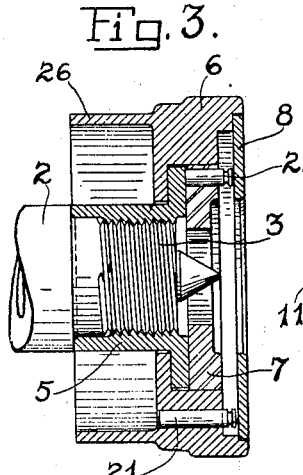
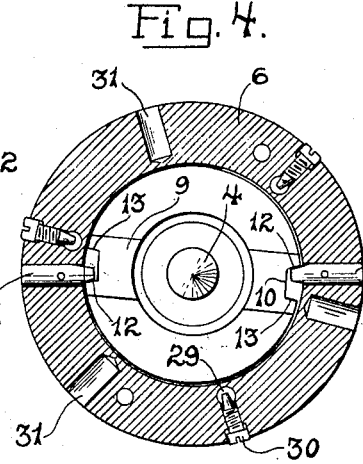
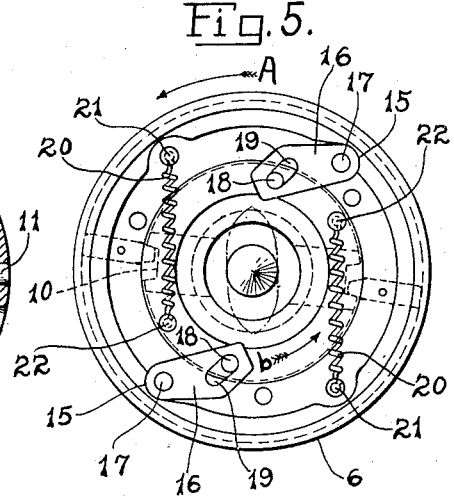
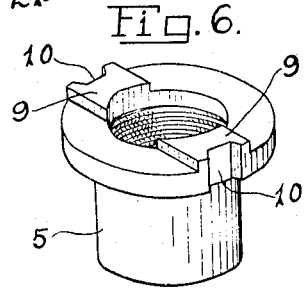
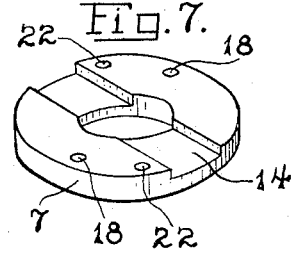
INVENTOR.
J. J. Thacher
BY Laurie L. Witter
ATTORNEY Patented May 25, 1926.

1,586,227

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

LATHE CHUCK.

Application filed November 20, 1922. Serial No. 602,260.

This invention relates to work driving chucks of the type shown in my Reissue Patent No. 15,643, dated July 3, 1923. The chuck of my present invention however is particularly adapted to operate as a driver for non-circular work. Accordingly, the primary object of the invention is to provide an improved chuck of this type particularly adapted to operate on non-circular work.

It is an object of the invention to provide an improved chuck of the type stated comprising a pair of oppositely disposed work engaging jaws and means for moving the jaws into and out of work engaging position to permit the removal and insertion of work pieces while the chuck is being rotated.

It is a further object of the invention to provide an improved chuck as stated comprising a pair of oppositely disposed work engaging jaws engaged by a driving element, the said element being floatingly mounted on one diameter of the chuck in a manner to equalize the driving action of the jaws on the work.

With the above and other objects in view, my invention consists in the features of construction and operation set forth in the following specification and illustrated in the accompanying drawing. In such drawing annexed hereto and forming a part of this specification I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is a side elevation, partially in section on line 1—1 of Fig. 2, of a chuck embodying my improvements.

Fig. 2 is a front view thereof with the cover plate removed and the chuck jaws in the work driving position.

Fig. 3 is a longitudinal sectional view taken on line 3—3 of Fig. 2.

Fig. 4 is an elevation partially in section on line 4—4 of Fig. 1.

Fig. 5 is a view like Fig. 2 but showing the chuck jaws in the inoperative position.

Fig. 6 is a perspective view of the driver.

Fig. 7 is a perspective view of the jaw driving element.

Fig. 8 is a detail sectional view on line 8—8 of Fig. 2.

Referring more specifically to the drawing by reference characters, 1 indicates the headstock of a lathe having a spindle 2 rotatably mounted therein. The chuck comprising my invention as illustrated is screw threaded to the spindle at 3. A center 4 on the end of the spindle is adapted to receive a work piece W.

My improved chuck, as illustrated, broadly comprises a driver 5, a substantially cylindrical body portion 6 mounted thereon, a work jaw driving element 7 within the body portion and a cover plate 8. The driver 5 is mounted on the spindle at 3 and is provided with a pair of lugs 9 on its front face, the periphery of the lugs being notched at 10. The body 6 has a pair of pins 11 extending respectively into the notches 10 whereby the body has a limited rotary movement on the driver, such movement being limited by the pins 11 engaging the ends 12 and 13 of the notches. The jaw driving element 7 is diametrically grooved at 14 and such element is mounted on the driver with the groove 14 in sliding engagement with the lugs 9 on the driver.

The body 6 is provided with two oppositely disposed curved recesses 15 within which is seated a pair of work engaging and driving jaws 16, such jaws preferably being mounted on pins 17 seated in the body 6. The work driving force is applied to the jaws from the jaw driving element 7, each jaw being illustrated as connected to such element by a pin 18 seated in the element and engaging within a slot 19 in its jaw. In Fig. 2 the jaws are shown in the work engaging and driving position and in Fig. 5 the jaws are shown in the disengaged position.

A pair of springs 20 respectively between the jaws 16, each has one end thereof connected to a pin 21 seated in the body 6 and the other end connected to a pin 22 seated in the jaw driving element 7. The tension of these springs tends to rotate the element 7 in the direction of the arrow a, Fig. 2, in a manner to close the jaws inwardly to the work. Other means is provided for opening the jaws against the action of the springs, such means comprising a pair of semi-circular brake bands 23 and 24 pivoted to a stud 25 and adapted to engage a flange 26 extending rearwardly on the body 6 to frictionally retard the rotation of such body. As fully disclosed in my copending application Serial No. 554,720, filed April 18th, 1922, a spring is provided for normally closing the brake bands onto the flange 26, the sliding movement of a rod 27 being adapted to open the bands. The several parts of the chuck are enclosed by the cover plate 8 provided with a plurality of pins 28 secured in openings 29 in the body 6 by means of screws 30. Radially extending holes 31 are provided in the body portion 6 for receiving pins for removing the chuck from the spindle.

In operation the spindle and chuck rotate in the direction of the arrow A, Figs. 2 and 5. The springs 20 normally tend to roate the element 7 relative to the body 6 in the direction of the arrow $a$, such rotation closing the jaws as illustrated in Fig. 2. The engagement of the pins 11 with the ends 12 of the notches 10 limits this relative rotation of such elements. When it is desired to place a piece of work in the chuck, the rod 27 is moved to permit the bands 23 and 24 to frictionally grip the flange 26 of the body 6. The continued driving force of the spindle through the driver 5 and jaw driving element 7 tends to rotate the body 6 therewith. Such action overcomes the tension of the springs 20 and rotates the element 7 relative to the body 6 in the direction of the arrow $b$, Fig. 5, thereby moving the jaws outwardly. The engagement of the pins 11 with the ends 13 of the notches 10 limits this relative rotation of such elements whereupon the body 6 continues to rotate with the element 7 in the relative position illustrated in Fig. 5. After the work is inserted into the chuck, the rod 27 is moved to release the bands from the flange 26 whereupon the springs 20 rotate the element 7 relatively to the body 6 in the direction of the arrow $a$ thereby closing the jaws onto the work. Through the engagement of the groove 14 with the lugs 9, the jaw driving element 7 is permitted a slight diametrical floating movement relative to the spindle and driver 5. This floating action of the jaw driving element 7 permits an equalizing of the driving action of the jaws on the work piece. Such function is particularly necessary when operating on a work piece which is not entirely symmetrical in form.

What I claim is:

1. A chuck for driving non-circular work comprising the combination of a body portion, a driver seated within the body portion and adapted to be mounted on a spindle, a jaw driving element seated within the body portion and connected to the driver for lateral floating movement thereon on a single diameter of the chuck, a plurality of work engaging jaws pivotally mounted on the body portion, and means connecting the jaws with the jaw driving element.

2. A chuck for driving non-circular work comprising the combination of a body portion, a driver seated within the body portion and adapted to be mounted on a spindle, a jaw driving element seated within the body portion and connected to the driver for lateral floating movement thereon on a single diameter of the chuck, a pair of work engaging jaws pivotally mounted on the body portion respectively on opposite sides of the said diameter, and means connecting the jaws with the jaw driving element.

3. A chuck for driving non-circular work comprising the combination of a body portion, a driver seated within the body portion and adapted to be mounted on a spindle, a jaw driving element rotatably seated within the body portion and connected to the driver for lateral floating movement thereon on a single diameter of the chuck, a plurality of work engaging jaws pivotally mounted on the body portion, means connecting the jaws with the jaw driving element, stop means for limiting the rotary movement of the element in the body portion, spring means for normally keeping the element at the limit of its movement in the body portion wherein the jaws are held in the work engaging position, and means for relatively moving the element and body portion against the action of the spring means to the other limit of their relative position whereby the jaws are moved out of work engaging position during the rotation of the chuck.

4. A chuck for driving non-circular work comprising the combination of a body portion, a driver seated within the body portion and adapted to be mounted on a spindle, a jaw driving element rotatably seated within the body portion and connected to the driver for lateral floating movement thereon on a single diameter of the chuck, a pair of work engaging jaws pivotally mounted on the body portion respectively on opposite sides of the said diameter, means connecting the jaws with the jaw driving element, stop means for limiting the rotary movement of the element in the body portion, a pair of oppositely disposed springs having their ends respectively connected to the jaw driving element and to the said body portion and normally keeping the element at the limit of its movement in the body portion wherein the jaws are held in the work engaging position, and means for relatively moving the element and body portion against the action of the said springs to the other limit of their relative position whereby the jaws are moved out of work engaging position during the rotation of the chuck.

5. A chuck for driving non-circular work comprising the combination of a body portion, a driver seated within the body portion and adapted to be mounted on a spindle, a jaw driving element seated within the body portion and having a lug and groove connection with the driver for lateral floating movement thereon on a single diameter of the chuck, a pair of work engaging jaws pivotally mounted on the body portion, means connecting the jaws with the jaw driving element, means connecting the body portion with the driver for limited rotary movement thereon, spring means for normally holding the body portion at one limit of its movement on the driver wherein the jaws are held in the work engaging position, and means for relatively moving the body portion and driver against the action of the spring means to the other limit of their relative position whereby the jaws are moved out of work engaging position during the rotation of the chuck.

6. A chuck for driving non-circular work comprising the combination of a body portion, a driver seated within the body portion and adapted to be mounted on a spindle, a pair of lugs on the driver, a jaw driving element seated within the body portion and having a diametrical groove therein seating over the said lugs, a pair of work engaging jaws pivotally mounted on the body portion respectively on opposite sides of the said groove, means connecting the jaws with the jaw driving element, the lugs on the driver having notches in the periphery thereof, means on the body portion engaging in the notches thereby connecting such two elements for a limited relative rotary movement, spring means for normally holding the body portion at one limit of its movemnet on the driver wherein the jaws are held in the work engaging position, and means for relatively moving the body portion and driver against the action of the spring means to the other limit of their relative position whereby the jaws are moved out of work engaging position during the rotation of the chuck.

In testimony whereof, I hereto affix my signature.

JOHN J. THACHER.